United States Patent [19]

Munro et al.

[11] Patent Number: 4,530,974
[45] Date of Patent: Jul. 23, 1985

[54] NONTHROMBOGENIC ARTICLES HAVING ENHANCED ALBUMIN AFFINITY

[75] Inventors: Mark S. Munro, Anna, Tex.; Alfred J. Quattrone, Westlake, Calif.; Steven R. Ellsworth; Robert C. Eberhart, both of Dallas, Tex.

[73] Assignee: Board of Regents, The University of Texas System, Austin, Tex.

[21] Appl. No.: 397,885

[22] Filed: Jul. 13, 1982

Related U.S. Application Data

[63] Continuation-in-part of Ser. No. 245,259, Mar. 19, 1981, abandoned.

[51] Int. Cl.$^3$ .................. C08G 69/46; C08G 63/70; C08G 78/82; C08F 8/02
[52] U.S. Cl. .................. 525/329.4; 523/112; 525/329.2; 525/123; 525/165; 525/178
[58] Field of Search .................. 523/112; 525/329.2, 525/329.4, 165, 178, 123

[56] References Cited

U.S. PATENT DOCUMENTS

| | | | |
|---|---|---|---|
| 3,051,588 | 8/1962 | Launchy | 525/329.4 |
| 3,429,860 | 2/1969 | Hurst | 525/379 |
| 3,479,328 | 11/1969 | Nordstrom | 525/336 |
| 3,546,194 | 12/1970 | Dasch | 525/359.5 |
| 3,563,896 | 2/1971 | Allen | 525/359.5 |
| 3,634,123 | 1/1972 | Eriksson | 424/183 |
| 3,639,339 | 2/1972 | Benton | 525/379 |
| 3,694,388 | 9/1972 | Connelly | 525/379 |
| 3,755,218 | 8/1973 | Yen | 523/112 |
| 3,826,678 | 7/1974 | Hoffman et al. | 117/81 |
| 3,846,353 | 11/1974 | Grotta | 260/17.4 R |
| 4,046,725 | 9/1977 | Pusineri | 523/112 |
| 4,066,581 | 1/1978 | Sieber | 260/8 |
| 4,082,507 | 4/1978 | Sawyer | 8/94 |
| 4,116,898 | 9/1978 | Dudley | 260/17.4 R |
| 4,118,349 | 10/1978 | Bonacker et al. | 260/8 |
| 4,144,128 | 3/1979 | Hildebrand | 525/329.2 |
| 4,167,045 | 9/1979 | Sawyer | 3/1 |
| 4,221,886 | 9/1980 | Topfl | 525/329 |

OTHER PUBLICATIONS

Batelle Today (Nov. 1981).
Eberhart et al., "Improvement of Albumin Adsorption on Polymer Surfaces by Alkyl Substitution", Abstract, American Heart Assoc. (Nov., 1981).
Munro et al., "Alkyl Substituted Polymers with Enhanced Albumin Affinity" Trans. Am. Soc. Artif. Intern. Organs vol. 27, (1981).
Science 217:1129–1130, (Sep. 1982).
Baier Ann, N.Y. Acad. Science 283:17–36, (1977).
Eberhart et al.,; "Protein Adsorption of Polymers" 73rd Annual Meeting Amer. Inst. of Chem. Eng., (Nov. 16–20, 1980).
Eberhart et al., "Alkyl Substituted Polymers with Enhanced Albumin Affinity", Abstract, Amer. Soc. for Art. Int. Organs (May 1981).
Plato, Doklady Adkademii Navk SSSR 229:496–499, (1976).
Lyman et al., Trans. Amer. Soc. Artif. Int. Organs 21:49–54, (1975).
Lyman et al., Trans. Amer. Soc. Artif. Int. Organs 18:19–23, (1972).

Primary Examiner—Joseph L. Schofer
Assistant Examiner—Peter F. Kulkosky
Attorney, Agent, or Firm—Arnold, White & Durkee

[57] ABSTRACT

Articles having reduced thrombogenicity when in contact with blood products containing albumin and methods of their use are provided. The articles comprise at the surface of blood contact a water insoluble polymeric substrate material having covalently attached thereon aliphatic extensions of 14 to 20 carbon units. When exposed to blood the aliphatic chain extensions provide a hydrophobic binding site for albumin. The articles when implemented with whole blood or blood products selectively enhance albumin affinity binding to the exclusion of other blood components, and subsequently minimize thrombus formation.

22 Claims, No Drawings

NONTHROMBOGENIC ARTICLES HAVING ENHANCED ALBUMIN AFFINITY

This is a continuation-in-part application of co-pending application Ser. No. 245,259 filed Mar. 19, 1981, now abandoned.

BACKGROUND OF THE INVENTION

The present invention relates generally to materials for biomedical application and more specifically to nonthrombogenic biomaterials having an enhanced affinity toward albumin.

In the application, implementation and implantation of biomaterials in bodily tissues, the problem of biocompatibility and biofunctionality of these materials has been the subject of extensive investigation. In particular those biomaterials which are intended to contact body tissues over a long period of time present various problems associated with physiological and chemical stability and compatability with respect to various contacted tissues.

Both bulk and surface properties determine the functional biocompatibility of the material. Mechanical strength, elasticity, flexibility, creep and fatigue resistance, chemical inertness, impermeability to water vapor, resistance to acid attack, etc. are desired bulk properties of many biomaterials which should be maintained in vivo. The surfaces of exogenous materials in contact with bodily tissues should desirably exhibit resistance to red and white thrombus formation (e.g. blood coagulation, platelet adhesion and aggregation) immunological attack, cell adhesion, pannus formation, etc. Thrombogenesis, embolization, pannus formation, etc. resulting from blood and other tissue interacting with the surface may compromise the intended use of the biomaterial in certain medical devices, and quite possibly result in device failure.

Application of most non-physiologic biomaterials and protheses to tissue contact initiates a series of physiologic events on the surface of such biomaterials. In particular, a biomaterial such as a synthetic polymer in contact with blood rapidly forms an adsorbed protein layer. Within seconds after application, the biomaterial interface is coated with a thin proteinaceous film, rich in fibrinogen, fibronectin and gamma globulin. As blood circulates, further protein components contribute to the thickness of the film. Conformational alterations and complexing of proteins occur, activating defense mechanisms, e.g. coagulation, platelet adhesion and aggregation, white cell adhesion, etc.

A number of approaches to provide tissue compatibility and specifically blood thromboresistance have been proposed and many promising materials have been developed. However none of the biomaterials developed heretofore have been totally successful and most have provided a poor compromise between device function and long term compatibility.

One such approach has been to modify the surface of existing biomaterials in an effort to prevent endogenous protein adhesion and accumulation so as to avoid coagulation and cell adhesion. Surface modification techniques which have been evaluated for biocompatibility and functionality include low polarity surfaces, negatively charged surfaces, and surfaces coated with biological material, e.g. enzymes, endothelial cells, and proteins.

The low polarity surfaces such as silicone polymers, and hydrogels, were developed in the view that low surface free energy, specifically low interfacial energy would limit the driving potential for adhesion of proteins and cellular material. Although the silicone biomaterials are substantially chemically inert and improve blood compatibility, platelet aggregation and cell accumulation eventually result with blood contact, especially at low blood flow rates.

Another approach to enhance thromboresistance was to provide materials having negatively charged surfaces. Electrets, hydrogels and negatively charged biological molecules such as heparin, exhibit this property and appear to have improved, but not provide complete thromboresistance. Hydrogels, water saturated polymeric gels exhibiting a net negative surface charge, offer high biological compatibility but by their very nature of high water content lack structural strength and durability.

The biological coated polymers are of considerable interest due to their variability and complexity. Proteinaceous material such as heparin, albumin, and streptokinase have all been covalently bound to polymeric surfaces to enhance thromboresistance. Albumin is of particular interest for a surface coating because of its apparent passivating activity.

Heretofore, albumin has been physically adsorbed, and electrostatically and covalently bound to polymer surfaces. While temporary and partial protection against thrombogenesis is obtained by these methods, the albumin coating is eventually denatured or lost. The loss of albumin functionality when passively adsorbed may be traced to competitive reactions with other proteins having higher affinities for the polymer surface, ablation of the adsorbed albumin, or conformational changes, and fragmentation. Furthermore covalently bound albumin is subject to internal masking by the polymer tertiary structure caused by long term reconstitution of the polymer surface. As the polymer undergoes tertiary reorganization new, unfilled binding sites are presented to which thrombogenic proteins may gain a "foothold".

It is therefore highly desirable to provide polymeric surfaces which are biocompatible and are functional over a long period of time. It is further desirable that these polymer surfaces provide consistent thromboresistance, resistance to cell adhesion in general and resistance to immunological attack over a range of blood flow rates including statis, pH, electrolyte conditions, and hematologic makeups such as anemia, polycythemia, and thrombocytemia.

SUMMARY OF THE INVENTION

This invention relates to biomaterials having covalently bound onto a water insoluble polymer substrate extended aliphatic hydrocarbon chains of 14 to 20 carbon atoms. In physiologic application these extended aliphatic hydrocarbon chains provide high affinity, reversible hydrophobic binding sites for albumin. Materials comprising the polymers of the present invention offer substantially improved surface adsorption binding of albumin, the major serum protein, relative to the other serum proteins. Selective adsorption of albumin to the exclusion of thrombogenic proteins is accomplished by exploiting the strong affinity albumin has for nonionic, hydrophobic aliphatic chains, in particular, $C_{14}$ to $C_{20}$ straight chained aliphatic hydrocarbon moieties.

Embodiments are discussed wherein various types of polymers, presently implemented as biomaterials for implants and tissue contact, are employed as substrates for the attachment of aliphatic hydrocarbon chain groups. As used herein aliphatic hydrocarbon chains are straight or branched, saturated or unsaturated hydrocarbon chains, namely alkyl or olefinic radicals. The aliphatic chain groups are preferably selected from the various straight chained alkyl, or olefinic compounds having 14, 16, 18 or 20 carbon residues, and most preferably having 16 or 18 carbon residues.

In general the biomaterials of this invention comprise at the surface of blood contact a water-insoluble polymeric substrate having covalently attached thereon a multitude of aliphatic hydrocarbon extensions, the aliphatic extensions effective to affinity bind albumin. A formula of these substituted polymers can be represented as

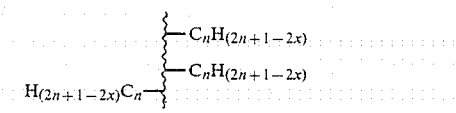

wherein the wavy line denotes a water insoluble polymeric substrate;—denotes the covalent attachment between the polymer and an aliphatic hydrocarbon extension; n is an integer ranging from 14 to 20; and x represents the number of double bonds in an olefinic chain, x being an integer ranging from 0 to $n-1$.

It is desired that only a singular aliphatic extension of 14 to 20 carbon residues be attached at only one particular covalent binding site. For example, attachment to functional group comprising two aliphatic extensions [—$NR_2$ wherein R is an aliphatic extension] may create a steric hindrance for the subsequent affinity binding of albumin.

DETAILED DESCRIPTION OF THE PREFERRED EMBODIMENTS

This invention relates to polymeric materials having selective enhancement toward albumin affinity. These materials are effective when exposed to blood products containing albumin to selectively binding albumin at the exposed material surface, thereby preventing subsequent thrombus formation and cell adhesion. Since the albumin binding contemplated by this invention is a dynamic process, the nonthrombogenic and surface passivating features of the materials are of indefinite long term duration.

The following discussion is in terms of the preferred embodiments of this invention, which represent the best mode known to the inventors at the time of this application.

In accordance with the preferred embodiments of this invention, a suitable water-insoluble polymer is provided in its solid or semi-solid state.

More particularly it is desirable that the polymers utilized by this invention be structurally stable. That is, polymers which have sufficient mechanical strength to be extruded, molded, expressed or formulated into solid construction materials such as films, sheets, conduct tubing, woven meshes and the like. Suitable polymers for use in this reaction are those polymers possessing active surface hydrogens, such as presented by an amino, imino, or amide groups. An active surface hydrogen is a hydrogen that may be removed by a proton-abstracting base without substantial disruption of the polymer backbone. Examples of polymers exhibiting active surface hydrogens include but are not limited to polyurethanes, amino-modified polyesters, polyamides, polyamines, polyimines, polyacrylamides, and amino-modified polystyrenes. Principally the active surface hydrogens are abstracted from an amino or imino group.

Selection of the polymeric substrate will vary according to the structural and functional needs of the biomaterial device. For example, to prevent thrombus formation on dialysis tubing or membranes, the processes of this invention are applied to cellulose membranes without substantially altering the membranes' original dialysis specifications. Indeed most structural biomaterials in wide application today are amenable to the processes of this invention.

Further, these polymers have no limitations as to size, shape, or form in which they may be utilized. The polymers may be subject to the substitution reactions of this invention before or after they are molded or extruded into their final form. In this regard, thin films, sheets, membranes, tubes, hollow fibers, and particulate matter are a few forms which are suitable for use in the present invention.

Further in accordance with such embodiments of the present invention, the polymer is exposed to a proton abstracting base to yield an activated polymeric surface. Suitable proton abstracting bases include but are not limited to sodium ethoxide, sodium butylate, potassium or sodium hydride, methyl magnesium bromide, and various isocyanates and diisocyanates.

Further in accordance with the preferred embodiments of this invention, chemical attachment of $C_{14}$ to $C_{20}$ aliphatic hydrocarbon chains to the polymer backbone is accomplished by exposing the activated polymer surface to a solution of the desired alkyl or olefinic reactants comprising functional group monomers such as alkyl or olefinic halides, alkyl or olefinic tosylate, alkyl or olefinic methylsulfonate, alkyl or olefinic isocyanate, or alkyl or olefinic monoamine. Specific aliphatic reactants include bromo-octadecane, octadecylisocyanate, cetylbromide, oleylchloride, myristylchloride, linoleylbromide, linolenylbromide, archidylbromide. The reaction is desirably accomplished in a non-proton donating solvent such as toluene, hexane, dioxane, diethyl ether or trimethylpentane.

The exposure times required to effect the substitution reactions will depend on the polymer substrate, the intermediate bifunctional molecule and/or the aliphatic monomer selected, the presence of a catalyst, and the desired extent of substitution. Generally, narrow ranges of the concentrations of reactants and exposure times are required to produce the greatest degree of polymer substitution. Further the concentration of reactants and the extent of exposure time will affect penetration of the polymer substrate.

Alternatively, polymers substantially without available surface active hydrogens, such as polyesters, are also amenable to the substitution reactions of this invention.

Rather than making the aliphatic hydrocarbon additions directly to polyester, it is desirable to modify the polyester monomer with an amino function prior to polymerization. For example as a starting material 2-nitro-1, 4 dimethylbenzene could be used in place of p-xylene. This material can be oxidized to form 2-nitroterephthalic acid. The nitro group is then reduced to an amino group and protected, as with trifluoroacetic anhydride reaction. This material is then polymerized, as in typical polyester synthesis. After synthesis the amino group can then be reacted with a fatty acid under standard conditions to give the aliphatic hydrocarbon substituted polymer.

As can be appreciated from the above discussions it is preferred that the aliphatic extensions be substituted along the polymer at an amino or imino function provided by the polymer substrate. Substitution of the aliphatic hydrocarbon at an amino or imino function of the polymer is preferred over substitution at other function groups such as the hydroxyl group on the polymer. The nitrogen linkage provides a more stable and durable attachment as opposed to an oxygen linkage. Such a reaction can be featured as:

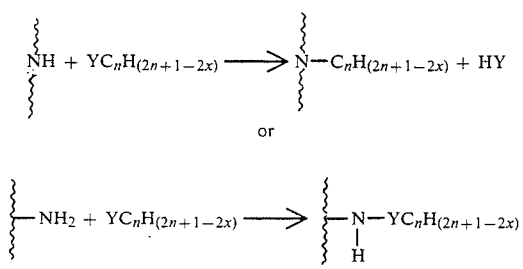

wherein Y is a suitable leaving group or intermediate functional linkage such as isocyanate.

Evaluation and measurement of enhanced albumin affinity to the various alkyl-substituted polymers as compared to non-substituted polymers were carried out as follows.

Polymer samples were first immersed in degassed phosphate buffered saline solution, pH 7.4, for more than 15 minutes to suitably hydrate the samples. A selected volume of albumin solution spiked with radiolabelled $^{125}$I-albumin as a tracer was mixed in the sample solution. The resulting albumin solution comprised a concentration of 12–50 mg albumin/dl in phosphate buffered saline. Crystalline human albumin, 99% pure, is available from Miles Laboratories and U.S. Biochemical Corporation. Albumin was radiolabelled according to a modified general technique of a globulin labelling procedure as described by Fraker and Speck, 80 *Biochem. Biophys. Res. Comm.* 849 (1978).

A twofold wash with phosphate buffered saline was conducted at the end of a 30 second $^{125}$I-albumin exposure period. Care was taken to ensure the sample remained well below the air-solution interface. Following the wash step, samples were transferred to counting vials and were counted for 5 minutes in a well-type scintillation counter (Tracor Analytic, Model 1191). The level of radioactivity directly corresponded to the extent of albumin binding to the polymer surface.

The preferred embodiments of this invention are better illustrated by the working examples which follow.

EXAMPLE I

A 2 cm$^2$ section of 2 mm thick polyurethane sheet (Pellethane 2363 - 80A marketed by The UpJohn Company, Kalamazoo, Michigan) was soaked in redistilled toluene (Fisher, estimated purity 99%) to remove surface impurities. The sheet was then transferred to 25 ml of 0.04 M sodium ethoxide (sodium ethoxide was prepared with pure sodium and spectrograde ethanol both marketed by Aldrich) in toluene agitating under dry nitrogen at room temperature for fifteen minutes. In the same vessel 25 ml of 2.0 M 1-bromo-octodecane (reagent grade produced by Aldrich) was reacted with the polymer sample while mixing at ambient room temperature for fifteen minutes. The chemically derivatized sheet was then removed from the reaction vessel and consecutively soaked for 30 seconds at ambient room temperature as follows: 25 ml of toluene once, 25 ml of ethanol twice, 25 ml of deionized water twice, 25 ml of 0.1N hydrochloric acid once, and finally 25 ml of deionized water twice, prior to air drying for 24 hours. A polyurethane was obtained having ramdom surface N-octadecyl urethane substitutions. Subsequent albumin studies indicated up to 7-fold albumin binding enhancement as compared to control samples of non-alkyl-substitued polymer materials.

EXAMPLE II

One gram portions of 4 mm diameter beads of Nylon$^R$ 6/10 and Nylon$^R$ 11 were washed separately in toluene and dried overnight, treated with sodium ethoxide and reacted with n-octadecyl bromide as described in Example I.

EXAMPLE III

Fifty milligram portions of woven polyester (i.e., Dacron$^{(R)}$) prosthetic vasculature were separately washed with toluene and dried overnight, treated with sodium ethoxide and reacted with octadecyl bromide as described in Example I. Increase of 30–50% in the binding of $^{125}$I-albumin was obtained upon 30 second incubation of the derivatized Dacron$^{(R)}$ with the radiolabelled album protein.

EXAMPLE IV

Two hundred milligram portions of polyacrylamide beads (50–100 mesh size) were separately washed with toluene and dried overnight, treated with sodium ethoxide and reacted with octadecyl bromide as described in Example I.

EXAMPLE V

A 1 cm$^2$ section of 2 mm thick polyurethane was soaked in toluene for 10 minutes and ethanol for 20 minutes. After vacuum drying overnight the section was placed in 50 ml of 0.25M n-octadecylisocyanate in trimethylpentane under dry N$_2$ and incubated for one hour at 80° C. with agitation. The sample was removed, twice soaked for 1 minute in 25 ml of ethanol, then twice soaked for 1 minute in 25 ml of deionized water before being redried to yield N-octadecyl-derivatized polyurethane. Radiolabelling studies of this derivatized polymer with $^{125}$I-albumin demonstrated up to a 5-fold enhancement in albumin binding. More recent experiments according to this description have demonstrated up to a 15 fold enhancement in albumin binding.

EXAMPLE VI

A one gram portion of 4 mm diameter Nylon$^{(R)}$ 6/12 beads was derivatized as described in Example V and yielded a similar 5-fold increase in the binding of $^{125}$I-albumin. Derivatization of Nylon$^{(R)}$ 11 beads behaved similarly.

EXAMPLE VII

Fifty milligram portions of woven polyester (i.e., Dacron(R)) prosthetic vasculature were separately derivatized as described in Example V.

EXAMPLE VIII

Two hundred milligram portions of polyacrylamide beads (50-100 mesh size) were separately derivatized as described in Example V.

Short term implantations of vascular grafts were carried out to assess the in vivo blood compatibility and non-thrombogenicity of the aliphatic substituted polymers of the present invention.

EXAMPLE IX

Wire reinforced polyurethane vascular grafts (Biomer$^R$, Ethicon), 4 mm OD by 0.5 mm wall thickness were cut in 5 cm lengths. For longer term studies, the support wire was stripped from the ends to a depth of 1 mm, and the polyurethane ends were partially redissolved in pure dimethylacetamide then dipped in liquid polyurethane to reweld the split ends. This was done to provide a better suturing surface. The derivatized grafts were alkylated by the one step method of Example V. Both control and alkylated grafts were soaked in normal saline for one hour prior to use.

Adult mongrel dogs, 25-30 kg, were premedicated with acepromazine (0.1 mg/kg IM), and anesthetized with Nembutal (30 mg/kg IV). A cuffed endotracheal tube was inserted and the animal was ventilated with room air on a volume guaranteed ventilator. The femoral arteries were mobilized and small branches were ligated over a 6-8 cm length.

For short term, 30 minute exposures, the femoral artery was cross clamped and an arterial segment approximately 2 cm shorter than the graft was excised. Saline-filled non-alkylated control and alkylated grafts were inserted bilaterally in each animal, in random order and position. The artery was sleeved approximately 4 mm over the graft proximally and distally and tethered with silk and umbilical tape. The cross clamps were then released and blood allowed to flow. No anticoagulant was used at anytime. No preexposure to albumin or any solution other than saline was employed.

Following 30 minute exposure, the femoral arteries were again cross clamped, the grafts quickly removed and flushed gently with saline followed by 25% gluteraldehyde solution. Grafts were immersed in the same fixative for 48 hours, under refrigeration.

Five duplicate experiments were carried out as described above.

The control grafts were all, (except One), densely coated with red thrombus. The apparently clean regions on one of the control grafts resulted from fracture of the thrombus during the process of cutting the graft open; the embedded wire caused the graft to spring open, once it was cut longitudially, shearing off the clot. In contrast, the alkylated grafts appeared very clean. These grafts were carefully observed during the flushing process following removal; no thrombus was observed emanating from the lumen of the graft. A small bit of red thrombus appearing on the one of the alkylated grafts was attached to the external wall. These results suggest that, in the period of maximum thrombogenic response for the dog (30–60 min), there is complete inhibition of red thrombus formation on the alkylated grafts.

The microscopic appearance of these grafts supports these findings. The control grafts all demonstrated dense accumulations of red cells and platelet aggregates. In those regions where the thrombus had fractured during the graft cutting process, there was a complete dense network of fibrin. In contrast, the alkylated graft surfaces all showed relatively small amounts of material deposition but essentially no fibrin (only one small segment in 20 fields). Three characteristic patterns of material deposition were observed on these alkylated surfaces. Forty percent of the viewed surfaces had mixtures of singly adherent platelets and white cells. The single platelets rather densely populated the surface, but did not aggregate. The white cells were not further identified in this study. Neither platelets nor white cells appeared to be endowed with large numbers of pseudopods, which might signify a high degree of cell activity. In a second category, thirty percent of the viewed surfaces had moderate numbers of singly adherent platelets, with relatively few pseudopods. The configuration of the platelets in this category is typical of surfaces which have been pre-albuminated, but this had not been done in this series. There were not white cells nor any fibrin adhering to the surfaces, in this category. The third category (30% of the viewed fields) had no cells on fibrin whatever adherent to the surface. The microscopic observations suggest that the alkylated polymers not only inhibited red thrombus formation, but also inhibited white thrombus, eg. platelet/white cell aggregation. The appearance of the singly adherent platelets with arrested pseudopod development is consistent with that of adherent platelets on prealbuminated polymers, which are then exposed to flowing blood. This provides support for the hypothesis that albumin from the first blood to come in contact with prosthesis is preferentially adsorbed to the alkylated polymer.

EXAMPLE X

For longer term studies the animals were heparinized (300 U/kg Beef lung heparin, Upjohn) following femoral arterial exposure. Following arterial cross-clamping and excision, grafts were sewn in place with either 6-0 Surgilene (PRE-1 needle) or 6-0 Prolene (RB-2 needle) using 8-10 sutures per anastomosis. Cross clamps were then released and anticoagulation was reversed if necessary with protamine. The tissue was closed in layers with 0 silk. Twenty minutes after release of the cross clamps, $^{125}$I spiked canine fibrinogen (15 mg/dl, 95% clottable, Miles) was infused IV. The animals were allowed to recover and were extubated but were held in the laboratory for subsequent studies. In the next 20-24 hour period both the alkylated and control grafts were scanned at 2-6 hour intervals with a portable scintillation detector (Canberra model 1701). The output of the scaler/counter was fed to a microprocessor (Cromenco Z2D/Burr Brown 12 bit ADC) for storage and display. Prior to scanning, animals were anesthetized with Xylazine (1 mg/kg, IM) and Ketamine (4 mg/kg/ IM). Animals were secured in the dorsal position Grafts were palpated and the legs positioned so as to align the grafts with a premarked grid on the skin, located 1 cm to the side of the incision line. The collimated detector with a 2×10 mm aperture was placed at the predetermined grid position and manually oriented for maximum count rate. Bilateral scans were performed (30 second count per site×3) at 1 cm intervals. Following the 24 hour study period, animals were again anesthetized with Xylazine/Ketamine, the grafts were exposed, removed, washed and fixed as described previously, in Example IX.

In longer term exposure of sutured grafts there was also evidence of the enhanced thromboresistance of the alkylated grafts. However, the results were not as dramatic as in the shorter term study. There was somewhat less thrombus on the control grafts and substantially more on the alkylated grafts at 24 hours than in the early period. The reason may be found in the serial scans for radio-labelled fibrinogen. In the early phase (first 4 hours) it was typically but not always observed that more fibrinogen was bound to the control graft, at all scanned sites. However, the fibrinogen deposits built up over the following hours on the alkylated grafts, as well, beginning at the anastomotic lines and proliferating through the graft from both the proximal and distal anastomoses. In some cases there would also be decreases in the $^{125}I$ fibrinogen scan experiments. Artifacts in the graft-absorbed fibrinogen were frequent, due to exudation of $^{125}I$ fibrinogen into the wound, difficulties in aligning the graft with the grid painted on the skin, and problems in maintaining the same orientation and solid angle of view of the collimated detector for all studies. Furthermore, it was observed that fibrin deposition was dependent on suture, needle and technique. In one study there was obtained direct confirmation, at 24 hour sacrifice, of proliferation of thrombus from the anastomotic lines: a thin fibrin strand, unattached to the wall, connected denser deposits at the anastomotic lines of the alkylated graft.

While these results suggest that alkylation does not prevent thrombus formation in vascular grafts in the early (24 hour) phase of graft development, there is evidence which suggest that mitigating circumstances, e.g. anastomotic line thrombosis, may be responsible for some of the deleterious results. Furthermore, there was strong evidence of a reduction in the extent of primary thrombus formation for all but the anastomotic region of these grafts. Finally, the development of anastomotic line thrombus does not preculude the successful clinical use of the alkylation technique in settings where intimate contact of polymer with tissue at suture lines or transmural sites, can be minimized.

EXAMPLE XI

A third experimental series was conducted to quantify the retention of pre-adsorbed albumin. The dogs were prepared, and sleeved grafts were inserted bilaterally, as described previously. In this instance systemic heparinization was employed to avoid albumin uptake in clot. A proximal femoral arterial branch was cannulated, and the distal femoral artery was also cannulated with a 23 gage butterfly. Human albumin in phosphate buffered saline PBS, spiked with $^{125}I$ albumin, was infused into the graft, replacing a PBS prime. The solution was incubated for 20 min, then scanned as described previously. The excess albumin solution was washed out with PBS (10 x volume replacement) and the grafts were re-scanned. Following removal of the perfusing cannulae, the cross clamps were released and blood was allowed for flow for 2–3 hours. The adjacent tissue was shielded with lead sheet. Scans for $^{125}I$ albumin (human) were performed at approximately 30, 60, 90, and 120 minutes.

The results of the in vivo albumin uptake study are given in FIGS. 15–17. Following saline wash, the preadsorbed $^{125}I$ albumin was preferentially bound to the alkylated Biomer grafts, typically at better than a 2:1 ratio compared to control grafts. The radiolabelled albumin was rapidly desorbed from both alkylated and control grafts; typically, 90% was removed by thirty minutes. However the ratio of the preadsorbed albumin between alkylated and control grafts typically remained greater than 2:1 throughout the two-three hour exposure period. Furthermore, even though the animals were heparinized throughout the study, thrombus was frequently observed on the control, but not the alkylated grafts.

UTILITY

Alkyl-substituted polymers of the present invention are useful especially as construction materials for a wide variety of biomaterials. For example, these products are useful in the construction of vascular graft tubing, dialysis membranes and dialysis exchangers, microporous membrane blood oxygenators, intra-aortic balloons, ultrafiltration membranes, blood bags, various catheters, coatings for sutures, soft or hard tissue prothesis, and artificial organs. Further, the alkyl-substituted polymers may have in vitro applications in, for example, equilibrium dialysis.

THEORETICAL CONSIDERATIONS

By establishing an albumin coating on biomaterials through selectively increasing the affinity of the surface for albumin, the problems of the prior art, e.g. passively absorbed endogenous albumin and covalently bound exogenous albumin are eliminated. The products of this invention provide a hydrophobic, nonionic binding site with enhanced affinity for endogenous albumin. As the native albumin denatures or desorbs at the aliphatic binding site, new albumin molecules favorably compete for replacement to the exculsion of other proteins. A dynamic, selective process is set up whereby albumin preferentially occupies the exposed binding sites by virtue of albumin's high concentration in the blood and the enhanced affinity provided by the aliphatic chains. More significantly, since many binding sites have been occupied and/or masked by the albumin-aliphatic chain complex, those proteins implicated in thrombus formation are inhibited from binding to the polymer surface. Thus, the high albumin affinity polymeric biomaterial, with its biologically functional, renewable albumin coat can maintain thromboresistance indefinitely.

The production of polymers having aliphatic chains covalently bound to the polymer surface is of considerable importance to the biomedical field in the application of biomaterials. The surfaces of biomaterials comprised of aliphatic substituted polymers exhibit improved thromboresistance and tissue compatibility without loss of functionality and stability. Further these products present minimal derivitization and disruption of polymer composition thereby avoiding the enhanced immunogenicity associated with bio-materials having foreign protein material directly attached to the polymer surface.

Moreover, the importance of this invention lies in the potential longevity of this blood compatible, modified polymer surface in long term implant applications. Further, the products of this invention overcome the problems associated with static coating of protein layers covalently linked to polymer surfaces. The earlier, covalently coated polymers have yielded their thromboresistance potential to such problems as denaturation during fixation to the polymer surface, loss of the protein coat by viscous drag in a flow field, serum protease degradation, and tertiary redistribution. The aliphatic side chain substituted polymers described herein, however, are not susceptible to these problems, but rather provide for dynamic replacement of albumin from blood or serum itself.

Although the invention has been described in terms of particular embodiments which the Applicants believe to represent the best modes of the invention at the time of this application, it will be recognized by those skilled in the art that various changes may be made in the product and method embodiments of this specification without departing from the scope of the invention as defined in the following claims.

What is claimed is:

1. A nonthrombogenic article adapted for use in contact with blood or blood products containing albumin, said article having on those surfaces which contact blood or blood products a water soluble, biocompatible, nonionic polymeric substrate having covalently attached thereon nonionic, aliphatic hydrocarbon extensions of 14 to 20 carbon atoms, the degree of aliphatic extension attachment effective to absorb albumin sufficient to retard thrombus formation on said surfaces.

2. The article of claim 1 wherein the aliphatic extensions are straight chained radicals.

3. The article of claim 1 wherein the aliphatic extensions are alkyl radicals.

4. The article of claim 1 wherein the aliphatic extensions are olefinic radicals.

5. The article of claims 2, 3 or 4 wherein the aliphatic extensions have 18 carbon atoms.

6. The article of claims 1 or 2 wherein the aliphatic extensions are myristryl, cetyl, octadecyl, arachidyl, oleyl or linoleyl or linolenyl.

7. The article of claim 1 wherein the polymeric substrate is polyurethane, polyamide, polyamine, polyacrylamide, polyimine, polyester, cellulosic, amino-modified polystyrenes or amino-substituted polyesters.

8. The article of claim 1 wherein the polymeric substrate provides an amino or imino functional group for the covalent binding site of the aliphatic hydrocarbon extentions.

9. The article of claim 1 wherein the polymeric substrate is structurally stable.

10. The article of claim 1 which further comprises albumin adsorbed to the hydrocarbon extensions.

11. A method for rendering nonthrombogenic at least one surface of article adapted for use in contact with bood or blood products containing albumin, comprising establishing on said article surface a water insoluble biocompatible, nonionic polymer substrate having thereon abstractable hydrogen sites effective for covalent attachment,
alkylating said substrate at said hydrogen sites with aliphatic hydrocarbon extensions of 14 to 20 carbon atoms, the degree of aliphatic extension attachment effective to provide a nonionic affinity binding site for an amount of albumin sufficient to retard thrombus formation on said surface.

12. The method of claim 11 wherein the aliphatic extensions are straight chained radicals.

13. The method of claim 11 wherein the aliphatic extensions are alkyl radicals.

14. The method of claim 11 wherein the aliphatic extensions are olefinic radicals.

15. The method of claims 12, 13 or 14 wherein the aliphatic extensions have 18 carbon atoms.

16. The method of claims 11 or 12 wherein the aliphatic extensions are myristryl, cetyl, octadecyl, arachidyl, oleyl, linoleyl or linolenyl.

17. The method of claim 11 wherein the polymeric substrate is polyurethane, polyamide, polyamine, polyacrylamide, polyimine, polyester, cellulosic, amino-modified polystyrene or amino-substituted polyesters.

18. The method of claim 11 wherein the polymeric substrate provides an amino or imino functional group for the covalent binding site of the aliphatic hydrocarbon extensions.

19. The method of claim 11 wherein the polymeric substrate is structurally stable.

20. The method of claim 11 which further comprises albumin adsorbed to the hydrocarbon extensions.

21. The article of claim 1 which is vascular graft tubing, dialysis tubing or membrane, blood oxygenator tubing or membrane, intra-aortic balloon, ultrafiltration membrane, blood bag, catheter, suture, soft or hard tissue prosthesis, or artificial organ.

22. The method of claim 11 wherein the article adapted for use in contact with blood or blood products is vascular graft tubing, dialysis tubing or membrane, blood oxygenator tubing or membrane, intra-aortic balloon, ultrafiltration membrane, blood bag, catheter, suture, soft or hard tissue prosthesis, or artificial organ.

* * * * *